(12) United States Patent
Cieslak et al.

(10) Patent No.: US 11,317,129 B1
(45) Date of Patent: Apr. 26, 2022

(54) TARGETED CONTENT DISTRIBUTION IN A MESSAGING SYSTEM

(71) Applicant: Snap Inc., Santa Monica, CA (US)

(72) Inventors: Michael Ronald Cieslak, Los Angeles, CA (US); Zahra Ferdowsi, Marina del Rey, CA (US); Jun Huang, Beverly Hills, CA (US); Michael David Marr, Monroe, WA (US); Jiayao Yu, Venice, CA (US); Finn Parnell, Los Angeles, CA (US); Aleksandr Zhang, Seattle, WA (US); Chao Pang, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/453,614

(22) Filed: Jun. 26, 2019

(51) Int. Cl.
| | |
|---|---|
| H04N 21/235 | (2011.01) |
| H04N 21/2343 | (2011.01) |
| H04N 21/84 | (2011.01) |
| H04L 51/066 | (2022.01) |
| H04L 12/58 | (2006.01) |

(52) U.S. Cl.
CPC ....... *H04N 21/2358* (2013.01); *H04L 51/066* (2013.01); *H04N 21/2353* (2013.01); *H04N 21/23439* (2013.01); *H04N 21/8402* (2013.01)

(58) Field of Classification Search
CPC ......... H04N 21/2358; H04N 21/23439; H04N 21/2353; H04N 21/8402
USPC .......................................................... 725/32
See application file for complete search history.

(56) References Cited

U.S. PATENT DOCUMENTS

| 8,990,869 B2 | 3/2015 | Hasek | |
|---|---|---|---|
| 10,282,524 B1* | 5/2019 | Evans | H04N 21/25435 |
| 2012/0079126 A1* | 3/2012 | Evans | H04L 67/303 |
| | | | 709/230 |
| 2012/0084792 A1* | 4/2012 | Benedek | G06F 9/544 |
| | | | 719/313 |
| 2015/0245103 A1* | 8/2015 | Conte | G06Q 30/0643 |
| | | | 725/60 |
| 2015/0363817 A1* | 12/2015 | Viharo | H04N 21/4784 |
| | | | 725/14 |

(Continued)

OTHER PUBLICATIONS

"U.S. Appl. No. 16/453,718, Non Final Office Action dated Aug. 19, 2021", 10 pgs.

(Continued)

*Primary Examiner* — Nathan J Flynn
*Assistant Examiner* — Caroline Somera
(74) *Attorney, Agent, or Firm* — Schwegman Lundberg & Woessner, P.A.

(57) ABSTRACT

Aspects of the present disclosure involve a system and method for providing the best available version of a content to a viewer client device considering the device capabilities of the viewer client device. To access the content, a viewer client device sends an access request comprising its device capabilities. Upon receiving the access request, the server computer generates a ranked list of all possible content versions for the viewer client device, the content versions being ranked based on their compatibility with the device capabilities of the viewer client device. The server computer selects, among the one or more available versions of the content, the content version ranked first in the ranked list and provides the selected content version to the viewer client device.

20 Claims, 7 Drawing Sheets

(56) References Cited

U.S. PATENT DOCUMENTS

| | | | | |
|---|---|---|---|---|
| 2017/0147581 A1* | 5/2017 | Srinivasan | ............. | G06Q 50/01 |
| 2017/0201779 A1* | 7/2017 | Publicover | ......... | H04N 21/2668 |
| 2017/0324996 A1* | 11/2017 | Thaker | ................ | H04N 21/252 |
| 2019/0182559 A1* | 6/2019 | Bennett | ............ | H04N 21/25833 |
| 2019/0197477 A1* | 6/2019 | Muller | ................... | G06Q 10/10 |

OTHER PUBLICATIONS

"U.S. Appl. No. 16/453,718, Examiner Interview Summary dated Oct. 21, 2021", 2 pgs.

U.S. Appl. No. 16/453,718, filed Jun. 26, 2019, Audience-Based Content Optimization in a Messaging System.

* cited by examiner

TARGETED CONTENT DISTRIBUTION IN A MESSAGING SYSTEM

BACKGROUND

As consumption of content on mobile devices continues to grow, the diversity of devices used to consume content via messaging applications also grows. Client devices used to consume content have different capabilities, such as in terms of processing power, and operating system. In addition, the capabilities of a client device, such as battery levels, available storage space, network type, and bandwidth, vary over time. Application developers infrequently consider the heterogeneous capabilities of the client devices used to run the applications which can negatively impact user experience.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A user can publish content to be shared with different types of audiences via a messaging application, such as public stories, private stories, stories shared with a custom audience. An audience includes one or more viewers each using one or more client devices to run the messaging application to access and view the content. Client devices used to run a messaging application have different capabilities in terms of processing power, operating system, screen size, video playback capabilities, networking capabilities, etc. . . . Overlooking the heterogeneous capabilities of the client devices used to run the messaging application can negatively impact user experience. As an example, if the content accessed by a client device requires more processing power than the hardware capabilities of the client device, the client device might experience severe lag and over-consumption of resources, such as faster battery drain. This results in a poor user experience and unnecessary waste of resources. On the contrary, if the content accessed by a client device requires less processing power than the hardware capabilities of the client device, the client device will not display the best content quality it could have, and the user will not get the best user experience. As another example, if a client device with limited available bandwidth downloads a high bitrate video, the download will be slow resulting in a poor user experience. On the contrary, if a client device with a large screen displays a low-resolution video, the video quality will be low resulting in a poor user experience.

Some of the disclosed embodiments improve the efficiency of the messaging application by providing the best available version of a content to a viewer client device considering the device capabilities of the viewer client device.

In some embodiments, a content to be shared via a messaging application is received at a server computer from a publisher client device associated with a publisher. The server computer retrieves a list of content versions associated with the publisher, each content version being associated with an associated set of content parameters. The server computer generates the one or more content versions of the content. To access the content, a viewer client device sends an access request comprising its device capabilities. Upon receiving the access request, the server computer generates a ranked list of all possible content versions for the viewer client device, the content versions being ranked based on their compatibility with the device capabilities of the viewer client device. The server computer selects, among the one or more generated versions of the content, the content version ranked first in the ranked list and provides the selected content version to the viewer client device.

In this way, the viewer client device can access the best available content version of the content based on its device capabilities. This increases the efficiency of running the messaging application on the viewer client device without wasting resources or degrading the overall user experience. Another solution would be to generate, for each expected viewer client device, a version of the content specifically tailored for the expected viewer client device. However, each version of the content requires server resources to be generated. Generating a single version of the content (or a limited number of versions of the content) that is compatible with every expected viewer client device limits the server resources required.

Figure 1:
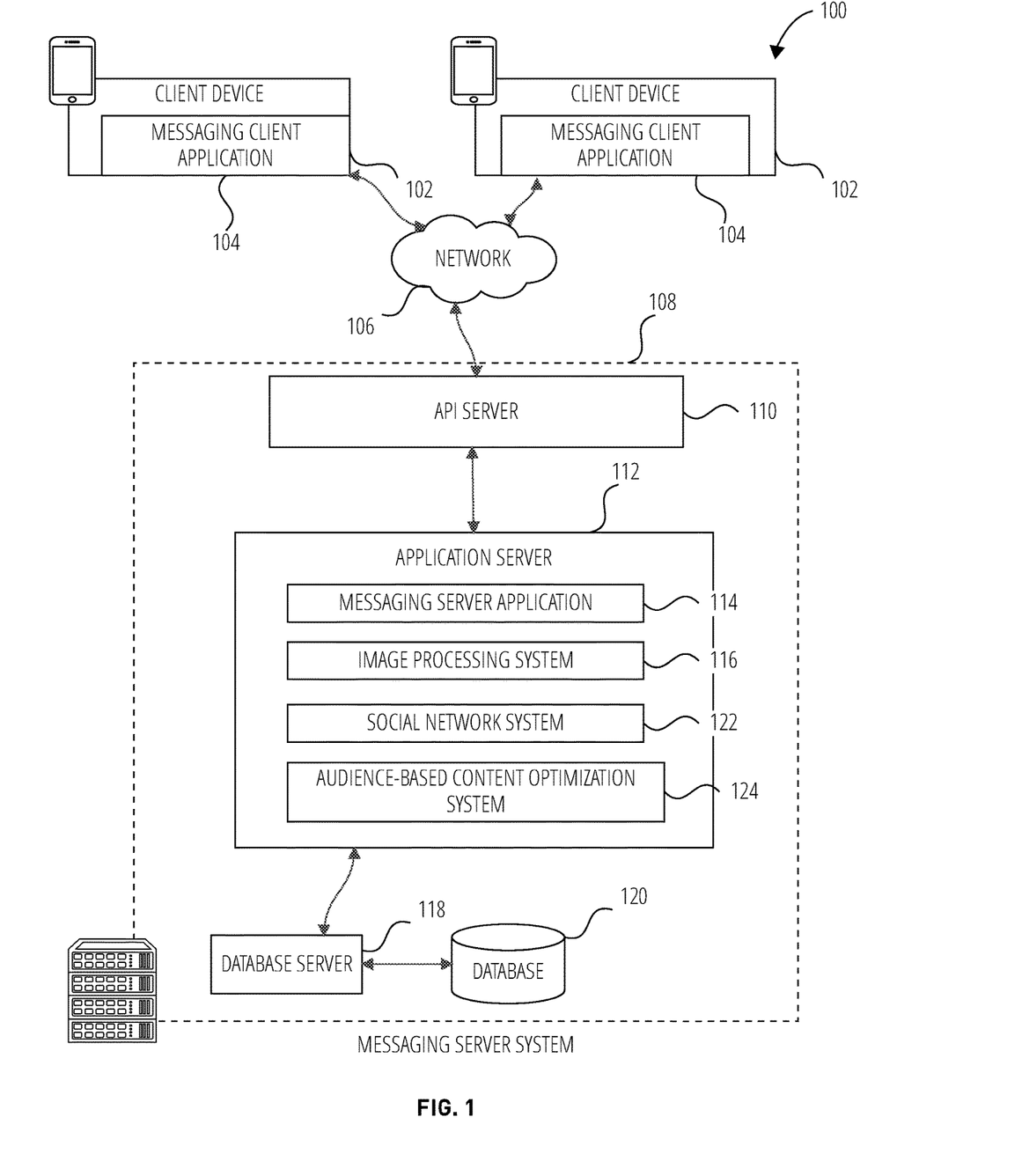
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122 and audience-based content optimization system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 2:
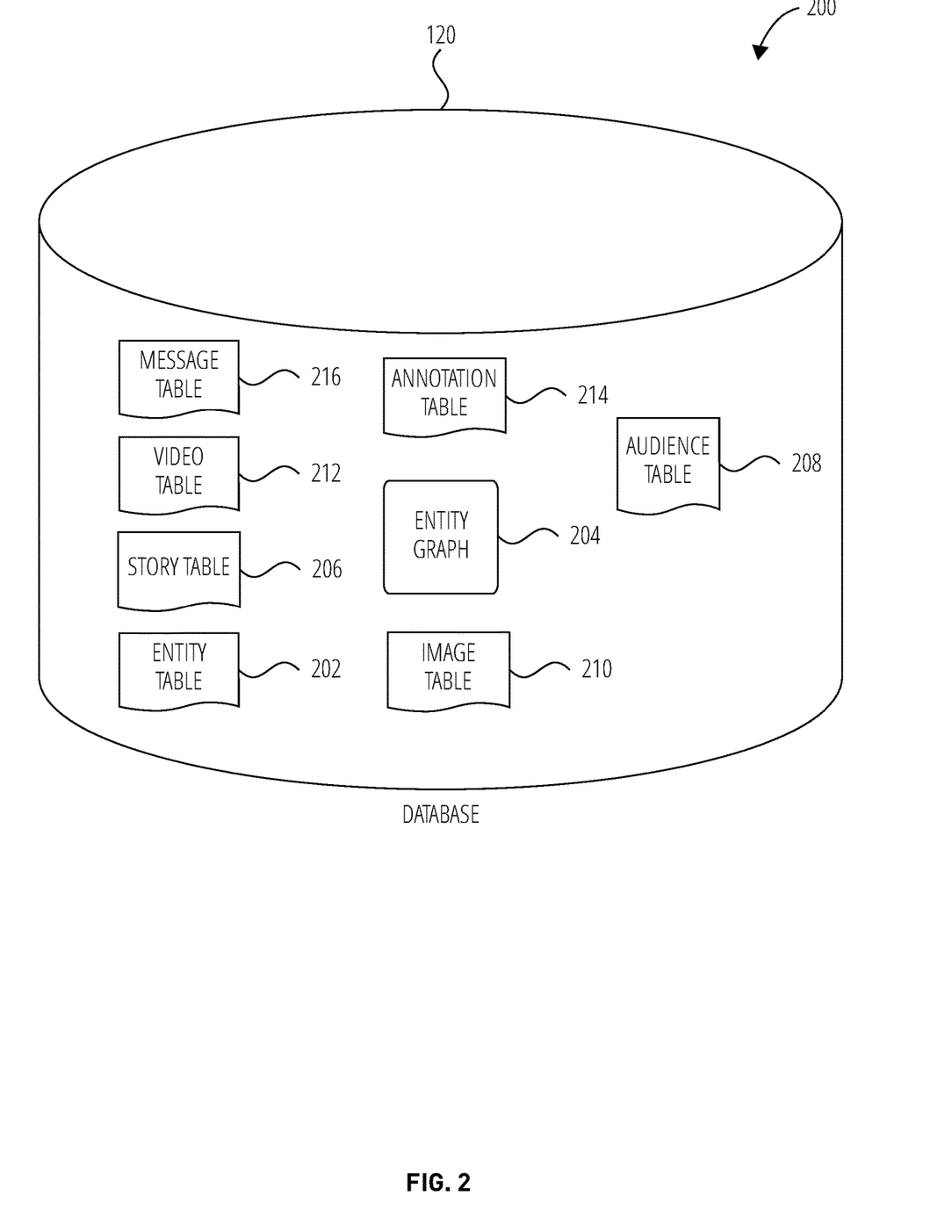
FIG. 2 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 204 (as shown in FIG. 2) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

The audience-based content optimization system 124 supports various audience-based content optimization functions, and makes these functions and services available to the messaging server application 114. To this end, the audience-based content optimization system 124 maintains and accesses an audience table 208 (as shown in FIG. 2) within the database 120.

FIG. 2 is a schematic diagram illustrating data structures 200 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 218. The entity table 202 stores entity data, including an entity graph 204. Entities for which records are maintained within the entity table 202 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 216. Filters for which data is stored within the annotation table 216 are associated with and applied to videos (for which data is stored in a video table 214) and/or images (for which data is stored in an image table 212). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 212 is so-called "lens" data. A "lens" may be a real-time special effect and sound that may be added to an image or a video.

As mentioned above, the video table 214 stores video data which, in one embodiment, is associated with messages for which records are maintained within the message table 218. Similarly, the image table 212 stores image data associated with messages for which message data is stored in the entity table 202. The entity table 202 may associate various annotations from the annotation table 216 with various images and videos stored in the image table 212 and the video table 214.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

An audience table 208 stores a list of content versions for various users who publish content via the messaging client application 104. A content version includes a set of content parameters, including content parameters such as a video coding format (or video compression format) which can be a content representation format for storage or transmission of digital video content, an image resolution and a data rate.

The audience table 208 may also store, for each of the plurality of content versions, statistics for the content version, such as a number of download, or a number of views associated with the content version. The audience table 208 is updated continuously or periodically as users publish contents via the messaging client application 104.

Figure 3:
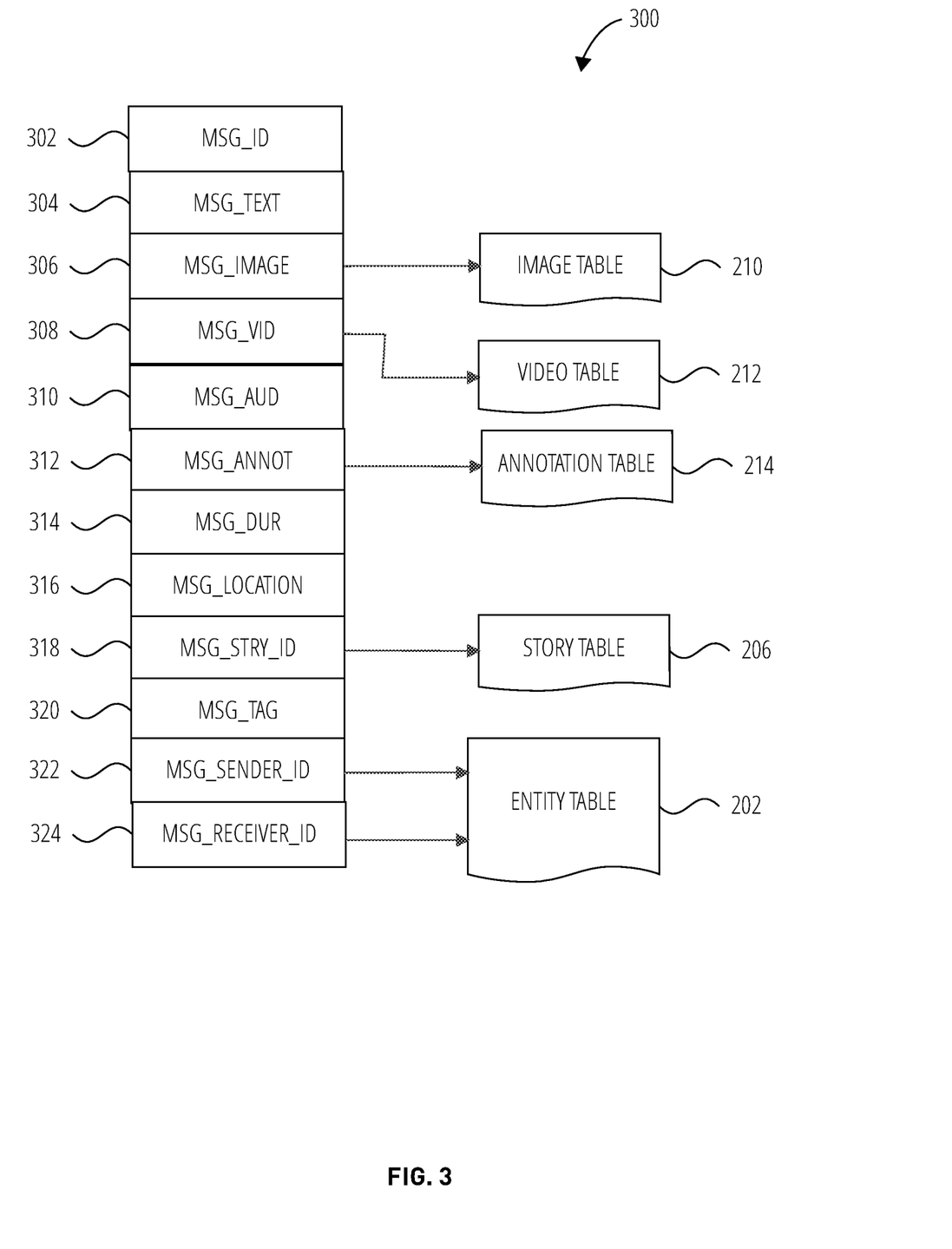
FIG. 3 is a diagrammatic representation of a message, in accordance with some example embodiments.

FIG. 3 is a schematic diagram illustrating a structure of a message 300, according to some in some embodiments, generated by a messaging client application 104 for communication to a further messaging client application 104 or the messaging server application 114. The content of a particular message 300 is used to populate the message table 218 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a user interface of the client device 102 and that is included in the message 300.

A message image payload 306: image data, captured by a camera component of a client device 102 or retrieved from a memory component of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from a memory component of the client device 102, and that is included in the message 300.

A message annotations 312: annotation data (e.g., filters, stickers or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, each of these parameter values being associated with respect to content items included in the content (e.g., a specific image into within the message image payload 306, or a specific video in the message video payload 308).

A message story identifier 318: identifier values identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent A message receiver identifier 324: an identifier (e.g., a messaging system identifier, email address, or device identifier) indicative of a user of the client device 102 to which the message 300 is addressed.

The contents (e.g., values) of the various components of message 300 may be pointers to locations in tables within which content data values are stored. For example, an image value in the message image payload 306 may be a pointer to (or address of) a location within an image table 212. Similarly, values within the message video payload 308 may point to data stored within a video table 214, values stored within the message annotations 312 may point to data stored in an annotation table 216, values stored within the message story identifier 318 may point to data stored in a story table 206, and values stored within the message sender identifier 322 and the message receiver identifier 324 may point to user records stored within an entity table 202.

Figure 4:
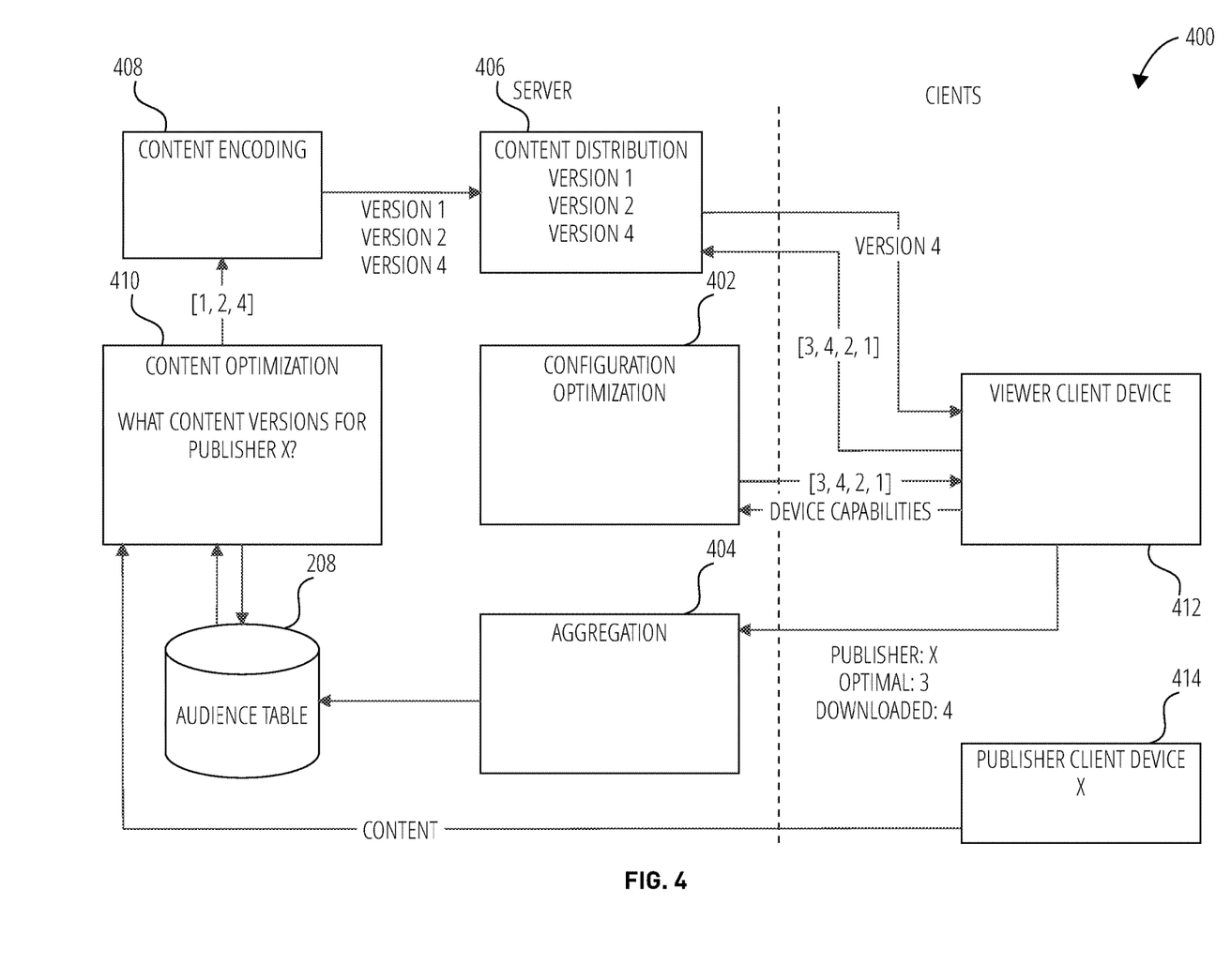
FIG. 4 illustrates a processing environment in accordance with one embodiment.

Turning now to FIG. 4, there is shown a diagrammatic representation of a processing environment 400, which includes a processor (e.g., a GPU, CPU or combination thereof).

The processor includes (either permanently configured or temporarily instantiated) modules, namely a configuration optimization component 402, an aggregation component 404, a content optimization component 410, a content encoding component 408, an audience table 208, and a content distribution component 406.

In response to receiving, from a publisher client device 414 (e.g., client device 102) associated with a publisher (e.g., publisher x), a content to be shared via the messaging application, the content optimization component 410 accesses the audience table 208 to identify a list of one or more content versions associated with the specific publisher (e.g., [1, 1, 4]). The list of one or more content versions is determined based on a predicted audience for the specific publisher, and more specifically on the device capabilities of the predicted viewer client devices included in the predicted audience of the specific publisher. The predicted audience includes the client devices that are expected to access and view the content published by the specific publisher. As explained below, the predicted audience is identified based on the client devices that have accessed the content published by the specific publisher in the past. Before a predicted audience for the specific publisher has been determined, the list of one or more content versions stored in the audience table 208 can be initialized with a default list of one or more content versions. A content version is defined by a set of content parameters. The set of content parameters can include parameters such as a video coding format (or video compression format) which can be a content representation format for storage or transmission of digital video content, an image resolution and a data rate. The device capabilities can include parameters such as processor capabilities, operating system capabilities, a messaging application version, a current battery level, an estimated available storage space, and an estimated available bandwidth.

In response to retrieving the one or more content versions associated with the specific publisher, the content optimization component 410 instructs the content encoding component 408 to generate all the content versions of the list, each of the content version being generated based on the associated set of content parameters.

In response to receiving the set of content parameters from the content optimization component 410, the content encoding component 408 generates the content versions, each of the content version being generated based on the associated set of content parameters. The content encoding component 408 then sends the one or more content versions to the content distribution component 406 for the one or more content versions to be made available to client devices.

To access a content published via the messaging application, a viewer client device 412 first sends, to the configuration optimization component 402, a content access request including its device capabilities information. In response to receiving the content access request comprising the device capabilities information from the viewer client device 412, the configuration optimization component 402 determines optimal content parameters for the viewer client device 412 based on the device capabilities of the viewer client device 412. The configuration optimization component 402 determines one or more optimal content versions based on the optimal content parameters determined for the viewer client device 412.

The configuration optimization component 402 determines a ranked list of content versions (e.g., [3, 4, 2, 1]) for the viewer client device 412, the content versions being ranked based on their compatibility with the device capabilities of the viewer client device 412. In some embodiments, the ranked list of content versions is based on a set of rules determining which content parameters are compatible with which device capabilities. For example, the set of rules may include one or more of the following rules:

- a certain video coding format requires a minimum available memory storage space;
- a certain video coding format requires a minimum current battery level;
- a certain video coding format requires certain disk level attributes;
- a certain video coding format requires a certain operating system version;
- a certain video coding format requires a certain messaging client application version;
- a certain video coding format requires a certain processor type;
- a certain image resolution requires a minimum screen size;
- a certain image resolution requires a minimum available memory storage space;
- a certain image resolution requires a minimum current battery level;
- a certain image resolution requires certain disk level attributes;
- a certain image resolution requires a certain operating system version;
- a certain image resolution requires a certain messaging client application version;
- a certain image resolution requires a certain processor type;
- a certain data rate requires a minimum available bandwidth or connection speed, quality or class;
- a certain data rate requires a minimum available memory storage space;
- a certain data rate requires a minimum current battery level;
- a certain data rate requires certain disk level attributes;
- a certain data rate requires a certain operating system version;
- a certain data rate requires a certain messaging client application version;

a certain data rate requires a certain processor type.

Upon receiving the ranked list of content versions (e.g., [3, 4, 2, 1]), the viewer client device 412 sends a content access request to the content distribution component 406, the content access request including the ranked list of content versions for the viewer client device 412. If the content version mentioned first in the ranked list of content versions (i.e., the optimal content version for the viewer client device 412) is available, the content distribution component 406 provides the content version mentioned first in the ranked list of content versions to the viewer client device 412. If the content version mentioned first in the ranked list of content versions is not available, the content distribution component 406 provides the first available content version mentioned in the ranked list of content versions. In the illustrated example of FIG. 4, the ranked list of content versions for the viewer client device 412 is [3, 4, 2, 1]. Content version 3 is not available, therefore the content distribution component 406 provides content 4 to the viewer client device 412, because content 3 is the first available content version mentioned in the ranked list of content versions.

In response to downloading a content version from the content distribution component 406, the viewer client device 412 sends a report to the aggregation component 404, the report including the content version mentioned first in the ranked list of content versions (i.e., the optimal content version for the viewer client device 412), and the content version downloaded by the viewer client device 412 (e.g., {Publisher ID, Optimal Media Variant, Retrieved Media Variant}). The report may further include a country of the viewer client device 412 (e.g., {Publisher ID, Viewer Country, Optimal Media Variant, Retrieved Media Variant}).

The aggregation component 404 aggregates the information (e.g., optimal content version, and downloaded content version) included in all the reports received for the specific publisher. The content optimization component 410 determines an updated list of one or more optimal content versions for the specific publisher based on the aggregated data. The updated list of one or more optimal content versions is an optimal list of content versions for a specific publisher based on the device capabilities of the predicted audience associated with the specific publisher. The content optimization component 410 updates the list of one or more optimal content versions associated with the specific publisher in the audience table 208. In the future, when the content optimization component 410 receives, from a publisher client device 414 associated with the specific publisher (e.g., publisher x), a new content to be published via the messaging application, the content optimization component 410 accesses the audience table 416 to retrieve the updated list of one or more optimal content versions associated with the specific publisher, and instructs the content encoding component 408 to generate all the content versions included in the updated list of one or more optimal content versions associated with the specific publisher.

Figure 5:
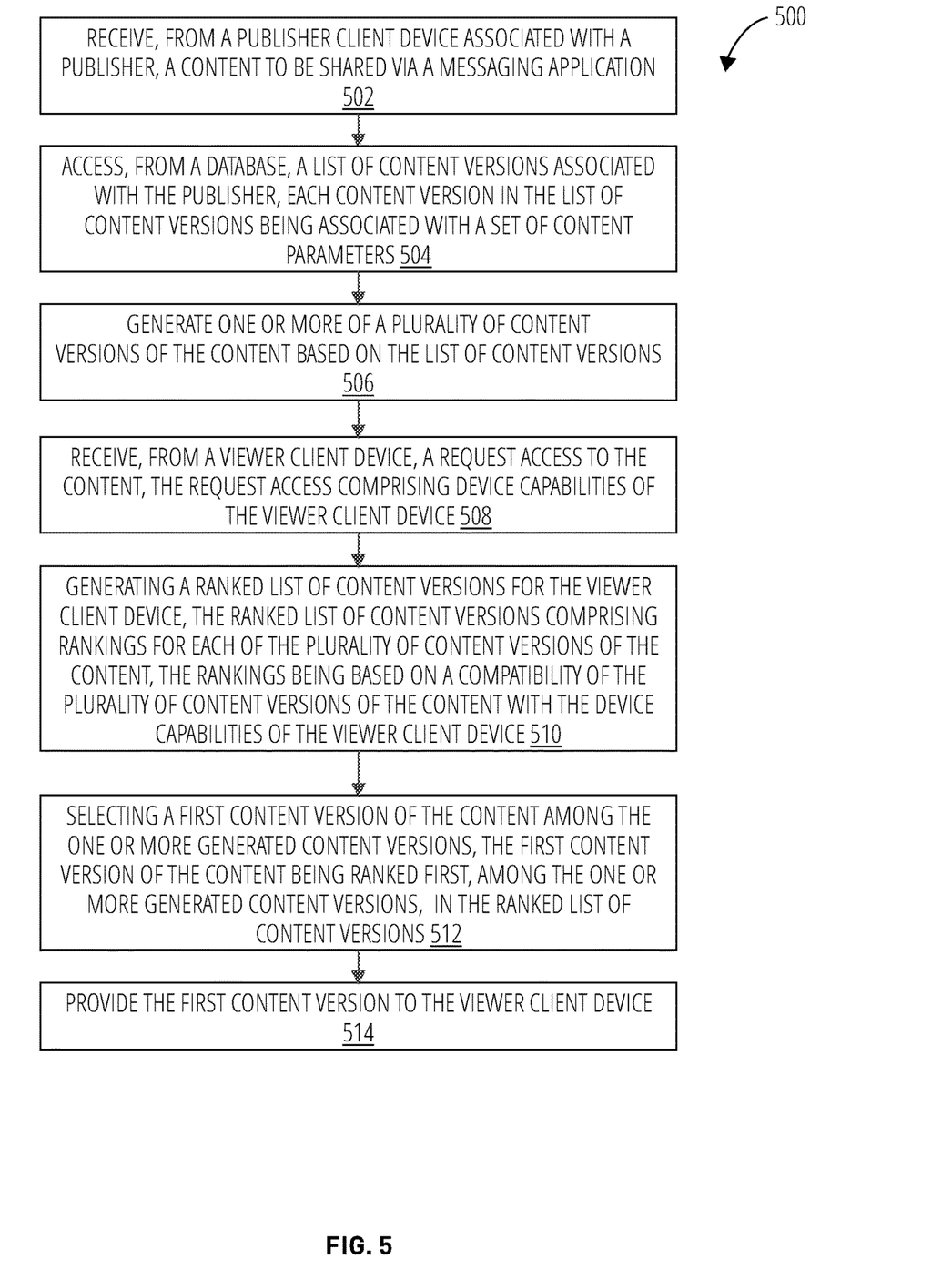
FIG. 5 illustrates a method in accordance with one embodiment.

FIG. 5 is a flowchart illustrating example operations of the audience-based content optimization system 124 in performing a process 500, according to example embodiments. The process 500 may be embodied in computer-readable instructions for execution by one or more processors such that the operations of the process 500 may be performed in part or in whole by the functional components of the messaging server messaging system 100 and/or messaging client application 104; accordingly, the process 500 is described below by way of example with reference thereto. However, in other embodiments, at least some of the operations of the process 500 may be deployed on various other hardware configurations. The process 500 is therefore not intended to be limited to the messaging server messaging system 100 and can be implemented in whole, or in part, by any other component. Some or all of the operations of the process 500 can be in parallel, out of order, or entirely omitted.

At block 502, the content optimization component 410 receives, from a publisher client device 414, a content to be shared via the messaging system 100.

In block 504, the content optimization component 410 accesses the audience table 208 to retrieve a list of content versions associated with the specific publisher. The list of content versions includes one or more of a plurality of possible content versions. Each content version is defined by a set of content parameters. The list of one or more content versions associated with the specific publisher can be determined based on the predicted audience for the content. The predicted audience for the content can be identified based on the viewer client devices that have accessed contents published by the specific publisher in the past. In particular, the list of one or more content versions can be selected based on the device capabilities of the viewer client devices that have accessed contents published by the specific publisher in the past.

In block 506, the content encoding component 408 generates the one or more content versions of the list. Each of the content version can be generated based on the associated set of content parameters.

In block 508, the configuration optimization component 402 receives, from a viewer client device, a content access request to access the content. The content access request can include the device capabilities information of the viewer client device.

In block 510, the configuration optimization component 402 generates a ranked list of content versions for the viewer client device. The ranked list of content versions includes all the possible content versions. The content versions are ranked based on the respective compatibility of each content version with the device capabilities of the viewer client device. In some embodiments, the configuration optimization component 402 determines the compatibility of a content version with the device capabilities of the viewer client device based on the set of rules determining which content parameters are compatible with which device capabilities.

In block 512, the content distribution component 406 selects a first content version of the content among the one or more generated content versions. The first content version of the content is, among the one or more generated content versions, the content version that is ranked first in the ranked list of content versions. In other words, the first content version is the best available content version for the specific viewer client device. If the content version ranked first in the ranked list of content versions is available, the content distribution component 406 selects the content version ranked first in the ranked list of content versions. If the content version ranked first in the ranked list of content versions is not available, the content distribution component 406 considers the content version ranked next (e.g., ranked second) in the ranked list of content versions. If this content version is not available, the content distribution component 406 continues down the ranked list of content versions until the best available content version is selected for the viewer client device.

In block 514, the content distribution component 406 provides the first content version to the viewer client device. In some embodiments, providing the selected content version to the viewer client device causes the selected content version to be displayed by the viewer client device.

Figure 6:
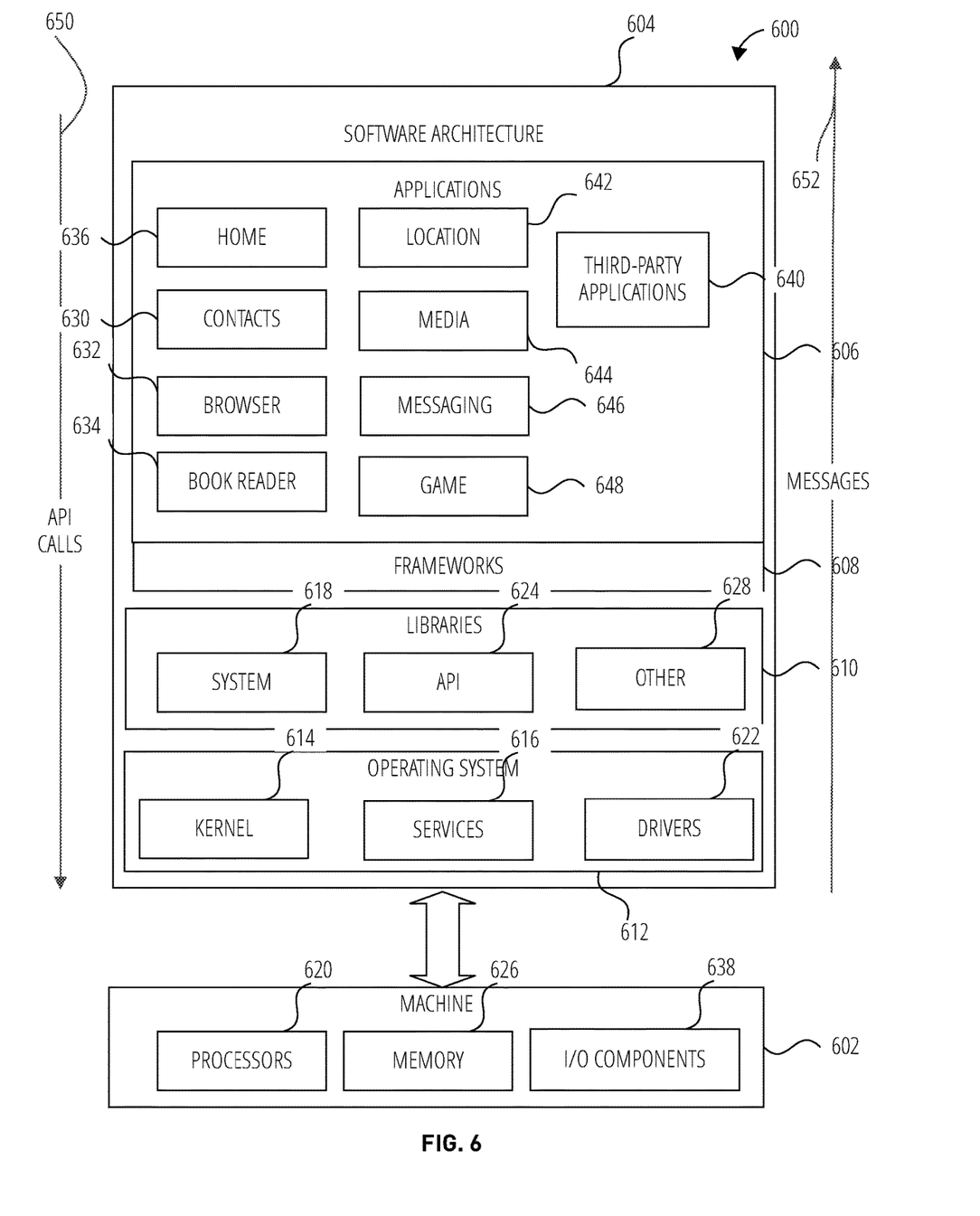
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
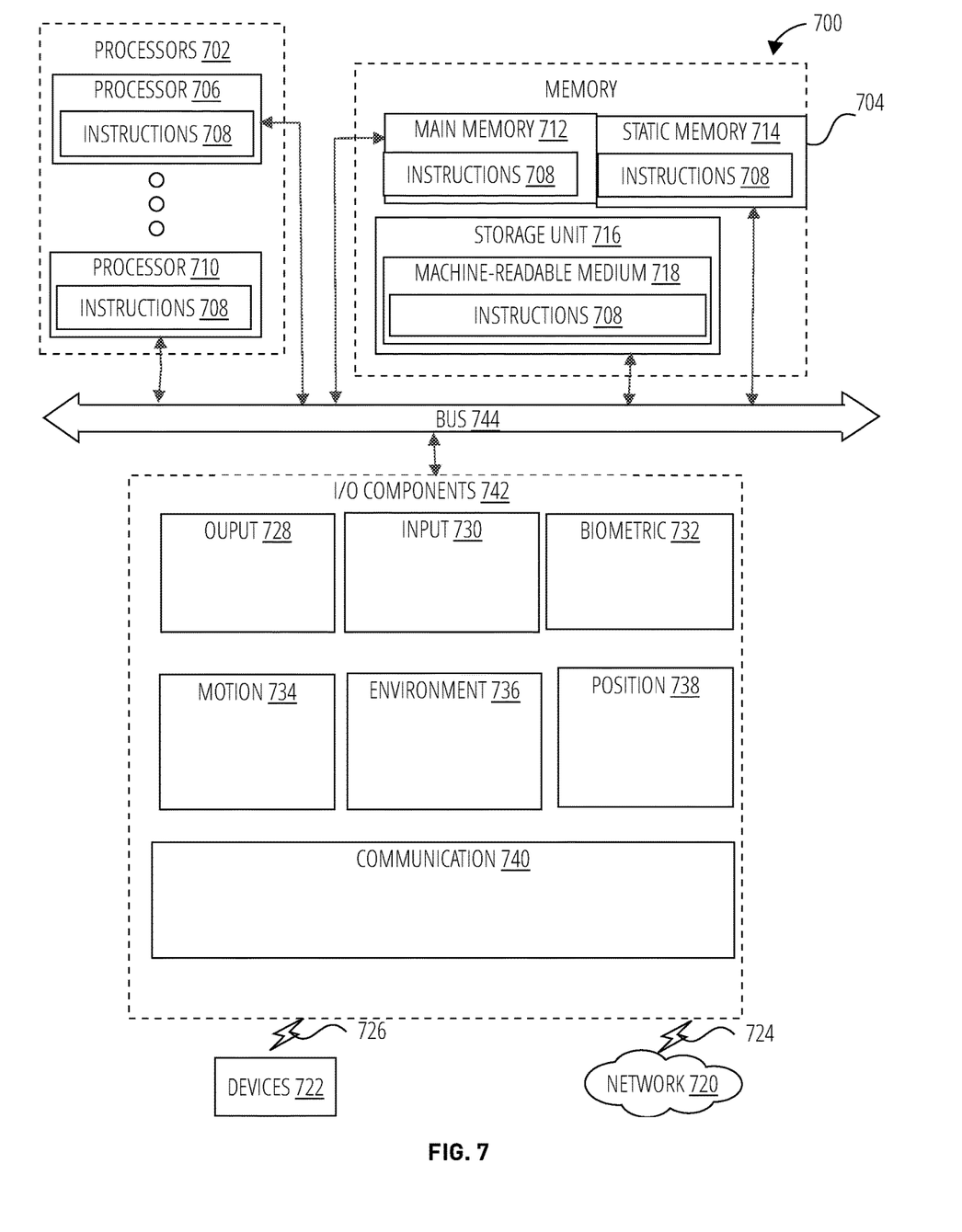
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

What is claimed is:

1. A method comprising:
   receiving, by one or more processors of a server computer, from a publisher client device associated with a publisher, a content to be shared via a messaging application;

determining, by the one or more processors, a predicted audience for the publisher, the predicted audience indicating device capabilities of viewer client devices that are expected to access and view contents published by the publisher;

determining, by the one or more processors, a list of content versions associated with the publisher based on the predicted audience for the publisher, each content version included in the list of content versions being associated with a set of content parameters;

accessing from a database, the list of content versions associated with the publisher;

generating, by the one or more processors, one or more of a plurality of content versions of the content based on the list of content versions;

receiving, by the one or more processors, an access request from a viewer client device for the content, the access request comprising device capabilities of the viewer client device;

generating, by the one or more processors, a ranked list of content versions for the viewer client device, the ranked list of content versions comprising rankings for each of the plurality of content versions of the content, the rankings being based on a compatibility of the plurality of content, versions of the content with the device capabilities of the viewer client device;

selecting, by the one or more processors, a first content version of the content among the one or more generated content versions, the first content version of the content being ranked first, among the one or more generated content versions, in the ranked list of content versions;

providing, by the one or more processors, the first content version to the viewer client device;

receiving, by the one or more processors, a plurality of reports from a plurality of viewer client devices, individual reports of the plurality of reports corresponding to an individual viewer client device and indicating a content version ranked first in a respective ranked list of content versions for the individual viewer client device and indicating a version of content downloaded by the individual viewer client device;

identifying, by the one or more processors, one or more reports of the plurality of reports that correspond to the publisher;

aggregating, by the one or more processors, information included in the one or more reports that correspond to the publisher to generate aggregated data; and generating, by the one or more processors and based on the aggregated data, an updated ranked list of content versions for the publisher based on the one or more reports.

2. The method of claim 1, wherein the ranked list is generated based on a set of rules indicating one or more content parameters that are compatible with one or more device capabilities.

3. The method of claim 2, wherein the set of rules indicates that a video coding format is compatible with at least one of a minimum available memory storage space, a minimum current battery level, one or more specified disk level attributes, a specified operating system version, a specified version of a messaging client application, or a specified processor type.

4. The method of claim 1, further comprising:
initializing an audience table stored by the database with a default list of one or more content versions of the publisher before the predicted audience for the publisher is determined; and updating the audience table to include the list of content versions, the audience table indicating a number of downloads or a number of views for each content version included in the list of content versions associated with the publisher based on the predicted audience for the publisher.

5. The method of claim 1, wherein the device capabilities include operating system capabilities, the rankings being determined based on the operating system capabilities of the viewer client device.

6. The method of claim 1, wherein the device capabilities include a messaging application version, the rankings being determined based on the messaging application version installed on the viewer client device.

7. The method of claim 1, wherein the device capabilities include a current battery level, the rankings being determined based on the current battery level of the viewer client device.

8. The method of claim 1, wherein the device capabilities include an estimated available storage space, the rankings being determined based on the estimated available storage space on the viewer client device.

9. The method of claim 1, wherein the set of content parameters includes a video coding format or an image resolution.

10. The method of claim 1, wherein the set of content parameters includes a data rate.

11. A system comprising:
a processor; and
a memory storing instructions that, when executed by the processor, configure the system to perform operations comprising:
receiving, from a publisher client device associated with a publisher, a content to be shared via a messaging application;
determining a predicted audience for the publisher, the predicted audience indicating viewer client devices that are expected to access and view contents published by the publisher;
determining a list of content versions associated with the publisher based on the predicted audience for the publisher, each content version included in the list of content versions being associated with a set of content parameters;
accessing from a database, the list of content versions associated with the publisher;
generating one or more of a plurality of content versions of the content based on the list of content versions;
receiving an access request from a viewer client device to the content, the access request comprising device capabilities of the viewer client device;
generating a ranked list of content versions for the viewer client device, the ranked list of content versions comprising rankings for each of the plurality of content versions of the content, the rankings being based on a compatibility of the plurality of content versions of the content with the device capabilities of the viewer client device;
selecting a first content version of the content among the one or more generated content versions, the first content version of the content being ranked first, among the one or more generated content versions, in the ranked list of content versions;
providing the first content version to the viewer client device;
receiving a plurality of reports from a plurality of viewer client devices, individual reports of the plurality of reports corresponding to an individual viewer client device and indicating a content version ranked first in a respective ranked list of content versions for the individual viewer client device and indicating a version of content downloaded by the individual viewer client device;

identifying one or more reports of the plurality of reports that correspond to the publisher;

aggregating information included in the one or more reports that correspond to the publisher to generate aggregated data; and generating, based on the aggregated data, an updated ranked list of content versions for the publisher based on the one or more reports.

12. The system of claim 11, wherein providing the first content version of the content to the viewer client device comprises causing display of the first content version of the content on the viewer client device.

13. The system of claim 11, wherein the device capabilities include an estimated available bandwidth, the rankings being determined based on the estimated available bandwidth of the viewer client device.

14. The system of claim 11, wherein the device capabilities include processor capabilities, the rankings being determined being determined based on the processor capabilities of the viewer client device.

15. The system of claim 11, wherein the device capabilities include operating system capabilities, the rankings being determined based on the operating system capabilities of the viewer client device.

16. The system of claim 11, wherein the device capabilities include a messaging application version, the rankings being determined based on the messaging application version installed on the viewer client device.

17. The system of claim 11, wherein the device capabilities include a current battery level, the rankings being determined based on the current battery level of the viewer client device.

18. The system of claim 11, wherein the device capabilities include an estimated available storage space, the rankings being determined based on the estimated available storage space on the viewer client device.

19. The system of claim 11, wherein the set of content parameters includes a data rate.

20. A non-transitory computer-readable storage medium, the computer readable storage medium including instructions that when executed by a computer, cause the computer to:

receive, from a publisher client device associated with a publisher, a content to be shared via a messaging application;

determine a predicted audience for the publisher, the predicted audience indicating viewer client devices that are expected to access and view contents published by the publisher;

determine a list of content versions associated with the publisher based on the predicted audience for the publisher, each content version included in the list of content versions being associated with a set of content parameters;

access from a database, the list of content versions associated with the publisher;

generate one or more of a plurality of content versions of the content based on the list of content versions;

receive an access request from a viewer client device to the content, the access request comprising device capabilities of the viewer client device;

generate a ranked list of content versions for the viewer client device, the ranked list of content versions comprising rankings for each of the plurality of content versions of the content, the rankings being based on a compatibility of the plurality of content versions of the content with the device capabilities of the viewer client device;

select a first content version of the content among the one or more generated content versions, the first content version of the content being ranked first, among the one or more generated content versions, in the ranked list of content versions;

provide the first content version to the viewer client device;

receiving a plurality of reports from a plurality of viewer client devices, individual reports of the plurality of reports corresponding to an individual viewer client device and indicating a content version ranked first in a respective ranked list of content versions for the individual viewer client device and indicating a version of content downloaded by the individual viewer client device;

identifying one or more reports of the plurality of reports that correspond to the publisher;

aggregating information included in the one or more reports that correspond to the publisher to generate aggregated data; and generating, based on the aggregated data, an updated ranked list of content versions for the publisher based on the one or more reports.

\* \* \* \* \*